United States Patent

Shimomura

[11] Patent Number: 5,091,964
[45] Date of Patent: Feb. 25, 1992

[54] APPARATUS FOR EXTRACTING A TEXT REGION IN A DOCUMENT IMAGE

[75] Inventor: Shoji Shimomura, Tokyo, Japan

[73] Assignees: Fuji Electric Co., Ltd., Kawasaki; Fujifacom Corporation, Hino, both of Japan

[21] Appl. No.: 678,217

[22] Filed: Apr. 1, 1991

[30] Foreign Application Priority Data

Apr. 6, 1990 [JP] Japan ............................ 2-91654

[51] Int. Cl.$^5$ ............................................. G06K 9/34
[52] U.S. Cl. ............................ 382/9; 382/18; 382/48; 382/51; 358/462; 358/464
[58] Field of Search ............ 382/9, 18, 43, 48, 50, 382/51; 358/456, 460, 462, 432

[56] References Cited

U.S. PATENT DOCUMENTS 4,403,257  9/1983  Hsieh ................................. 358/462
4,447,830  5/1984  Stoffel ................................. 358/462
4,741,046  4/1988  Matsunawa et al. ............. 358/464

FOREIGN PATENT DOCUMENTS

344788  2/1991  Japan ............................ 606 X/9/20

Primary Examiner—David K. Moore
Assistant Examiner—Jose L. Couso
Attorney, Agent, or Firm—Spencer & Frank

[57] ABSTRACT

A peripheral distribution of filled pixels in a document image is calculated by projecting the filled pixels in an X-axis or a Y-axis direction. A bottom part in the peripheral distribution is detected. The document image is divided into a plurality of primary image regions in accordance with a dividing line intersecting the bottom part in the X-axis or Y-axis direction, so that the document image is classified into text regions, drawing regions and picture regions. Thus, the text regions can be extracted automatically from the document image without requiring a specific manual operation for extracting text regions by an operator.

14 Claims, 7 Drawing Sheets

APPARATUS FOR EXTRACTING A TEXT REGION IN A DOCUMENT IMAGE

BACKGROUND OF THE INVENTION

1. Field of the Invention

The present invention relates to an apparatus for extracting a text region in a document image, which makes it possible to discriminate and extract a text region automatically in a document image containing a mixed form of texts, drawings and pictures. Preparatory input operation work for extracting a text region by an operator when character symbols in a test region are recognized by a character recognition apparatus is eliminated.

2. Description of the Prior Art

As a prior art apparatus, well known is an apparatus wherein binary document image data is processed in a simple manner in order to eliminate noise in the data, and then a peripheral distribution of filled or black pixels in the document image is estimated by means of a projection calculation which is performed by comparatively easy computational operations, and subsequently a blank portion or an unfilled pixel region where the peripheral distribution is substantially equal to zero is detected to determine a boundary line between adjacent text regions.

However, in this type of prior art apparatus, a blank portion where a peripheral distribution is substantially equal to zero is detected, so that in the case of recognizing a document image having a complex layout form in a text, it may happen that a portion in the peripheral distribution where a projection calculation value is equal to zero cannot be found even though there exists a blank portion as a boundary between adjacent text regions. In this case, all the boundary lines cannot be detected automatically and accordingly an operator must input preparatory information for extracting text regions.

SUMMARY OF THE INVENTION

It is a primary object of the present invention to provide an apparatus for detecting more precisely the existence of a blank portion or an unfilled pixel region as a boundary between adjacent text images.

It is a second object of the present invention to provide an apparatus for extracting a text region automatically or without manual operation from a document image even having a complex layout form containing drawings and/or pictures as well as texts.

In the first aspect of the present invention, an apparatus for extracting a text region in a document image has projection calculation means for calculating a peripheral distribution of filled pixels in a document image, which contains a mixed form of text and other kind of visual information and which is represented in terms of binary data, by projecting the filled pixels in a predetermined direction; detection means for detecting a bottom part in the peripheral distribution calculated; and dividing means for dividing the document image into a plurality of primary image regions in accordance with a line intersecting the bottom part in the predetermined direction.

In the first aspect of the present invention, considered is a characteristic of document image data where the greater an existence ratio of a blank portion or unfilled pixels along the line prescribed above, the more the peripheral distribution value at the position corresponding to that line reaches zero. A line in the document image which contains a blank portion or unfilled pixels and which otherwise could not be detected in the prior art apparatus is detected by detecting the bottom part in the peripheral distribution. The document image is divided by this line formed as described above, so that a document image can be classified into image regions, each containing a specific type of images such as text, drawing and picture, even if the document image has a complex layout form.

In an apparatus for extracting a text region in a document image of the second aspect of the present invention, said predetermined direction is a direction extending along an X-axis or a Y-axis. The apparatus comprises reduction means for reducing or scaling down each of the plurality of primary image regions divided by said dividing means until the size of said primary image region reaches the size of a circumscribed rectangular frame of filled pixels to form a plurality of secondary image regions in which unfilled pixels are excluded from the primary image regions; consolidating means for consolidating a plurality of secondary image regions adjacent to one another among said plurality of secondary image regions into a single tertiary image region; and extraction means for calculating a line density of filled pixels in said tertiary image region consolidated and for extracting a text region from said document image by judging that said tertiary image region is a text region when said calculation result indicates a text image.

In this second aspect of the present invention, there is the possibility that one image with a greater size is likely to be divided further into two regions with a dividing line when a document image is divided into blocks. With this in view, in the second aspect of the present invention, the reduction means separates a document image into image regions with unfilled or blank pixel regions and then the consolidating means consolidates the secondary image regions adjacent to each other, so that image regions divided by the dividing line and of the same type of image are consolidated. As a result, the shape of the image regions formed by the consolidating process described above is closely similar to the layout of the actual document image.

In the third aspect of the present invention, the apparatus for extracting a text region in a document image as defined in the first or second aspect described above further comprises smoothing means for smoothing binary image data to be used for projection calculation by said projection calculation means.

In the third aspect of the present invention, the binary image data is smoothed, so that noise involved in the binary image data can be reduced and hence the accuracy of detecting a bottom part in the peripheral distribution can be enhanced.

In the fourth aspect of the present invention, the apparatus for extracting a text region in a document image as defined in the second aspect described above further comprises display means for displaying said tertiary image data extracted by said extraction means in the form of a visual drawing.

In the fourth aspect of the present invention, drawing information is displayed by the display means, so that an operator can observe visually the layout of text regions in the document image.

In the fifth aspect of the present invention, the extraction means as defined in the second aspect of the present invention further uses a filled-pixel density in addition to said line density when a type of a document image is judged.

In the fifth aspect of the present invention, a filled pixel density is also considered in addition to the line density when judging a document image, the accuracy of judging types of image regions is enhanced by adding a filled pixel density as one of the judging factors.

BRIEF DESCRIPTION OF THE DRAWINGS

Embodiments of the invention will now be described, by way of example, and with reference to the accompanying drawings in which.

DETAILED DESCRIPTION OF PREFERRED EMBODIMENTS

Figure 1:
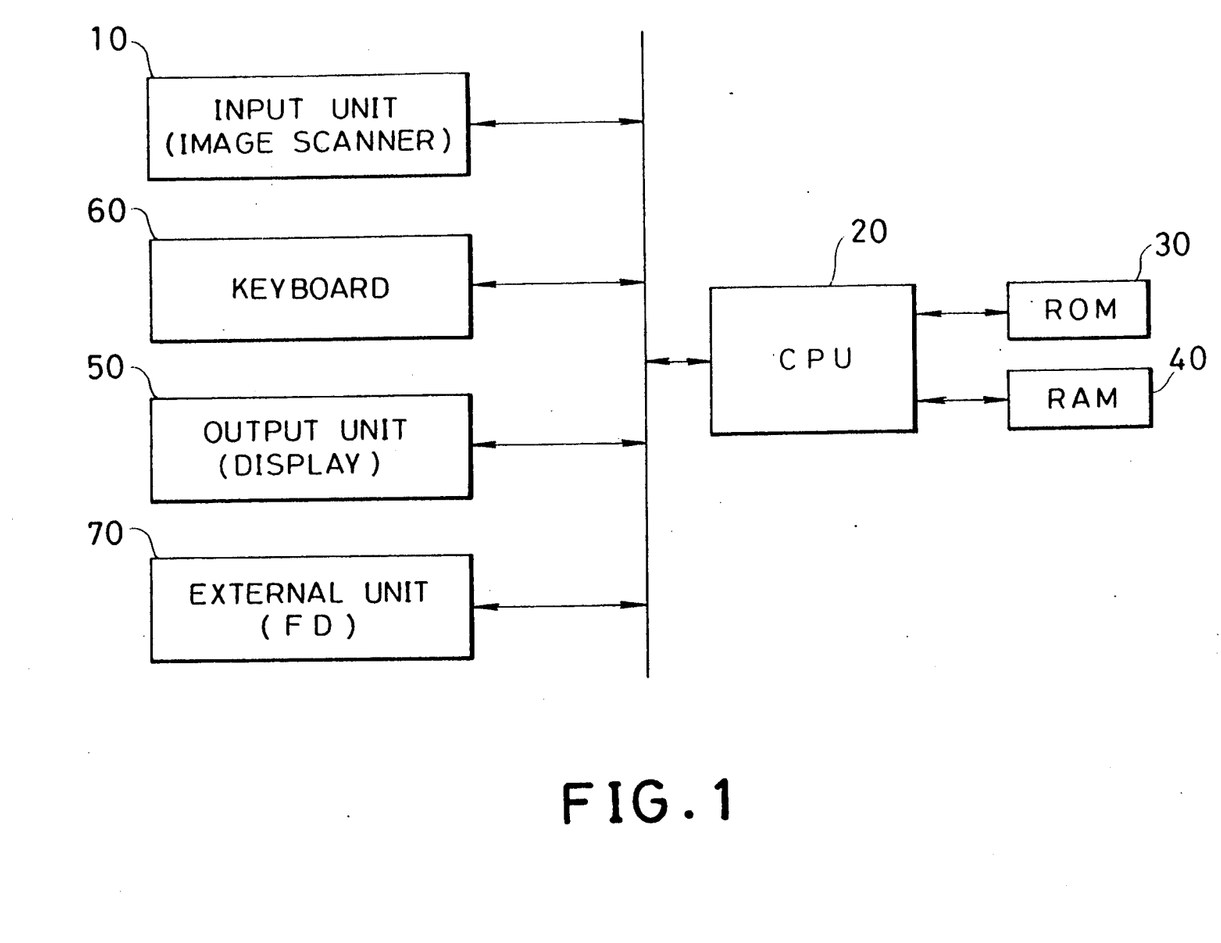
FIG. 1 is a block diagram showing an embodiment of an apparatus in accordance with the present invention.
Figure 2:
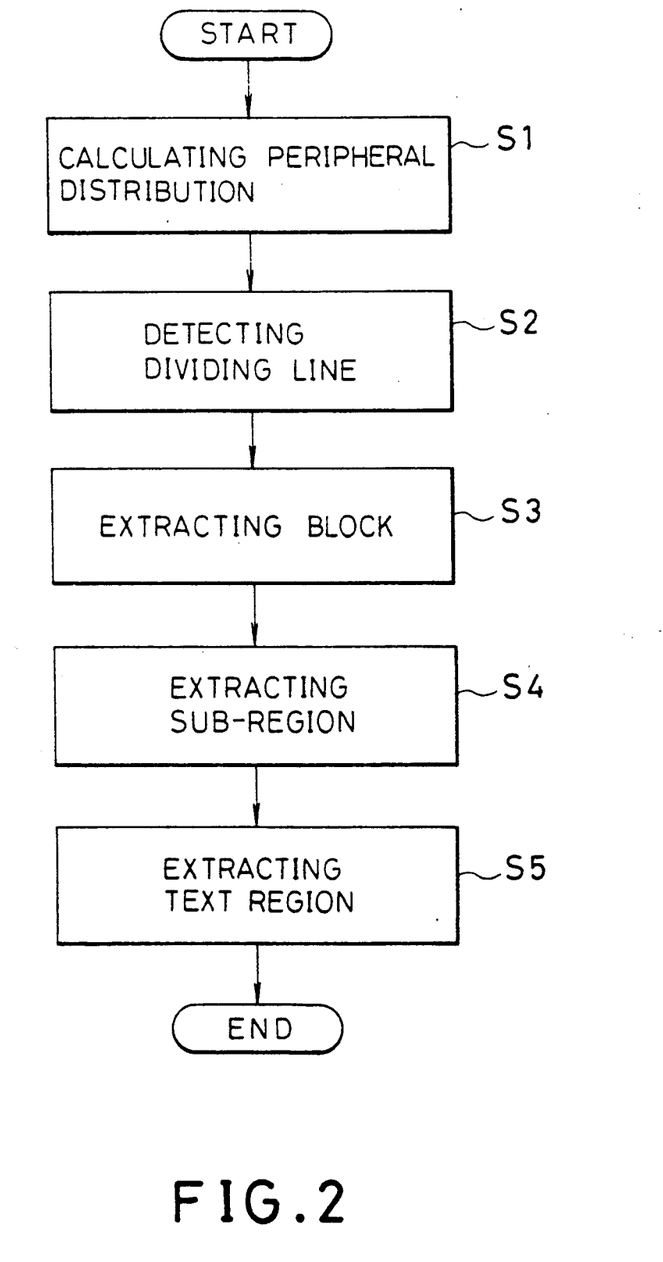
FIG. 2 is a flow chart illustrating an embodiment of processing steps to be performed by an embodiment of an apparatus according to the present invention.

FIG. 1 is a block diagram showing an embodiment of an apparatus for extracting a text region in accordance with the present invention. In FIG. 1, reference numeral 10 denotes an input unit, for example, an image scanner for obtaining a text image as image data. The text image thus obtained is supplied to a central processing unit or CPU 20. The CPU 20 is controlled by a program stored in an ROM 30. An example of a flow chart corresponding to the program is shown in FIG. 2 and will be explained in more detail with reference to FIG. 2. The input text image data is temporarily stored in an RAM 40 as a work memory. The CPU 20 functions together with the ROM 30 as means for calculating a peripheral distribution, means for detecting a dividing line, means for extracting a block, means for extracting a sub region and means for extracting a text region, which will be explained in more detail with referring to FIG. 2. Reference numeral 50 denotes an output unit, for example, a display unit for displaying a text region extracted. Reference numeral 60 denotes a key board for inputting word data and instructions. Reference numeral 70 denotes an external unit such as a floppy disc unit for storing text region data and text data.

FIG. 2 is a flow chart illustrating an example of a control procedure of extracting a text region in the embodiment of an apparatus in accordance with the present invention shown in FIG. 1. An electronic operation circuit of an apparatus for extracting text regions, for example, a central processing unit (CPU), executes the following operation and image processings in accordance with this flow chart. In the following, the apparatus for extracting text regions of the present invention shown in FIG. 1 will be explained with reference to the flow chart shown in FIG. 2.

First, at step S1, a calculation is made for obtaining a peripheral distribution.

In the operations in step S1, a document image is inputted to the apparatus from the input unit 10 such as an image scanner and is converted into binary data. Then, by projecting filled pixels in the image data onto an X-axis and a Y-axis, the distribution of pixels in the image is measured along two diagonal and peripheral lines stretched from one corner of the rectangular covering the image. This distribution is designated as "peripheral distribution". Projection of filled or black pixels means an operation where the number of filled pixels on each line in the X-axis or Y-axis direction is measured and mapped on the X-axis or Y-axis. If the number of filled pixels in the X-axis direction is measured and mapped on the Y-axis, this mapping in the Y-axis direction is called "Y-axis projection". If the number of filled pixels in the Y-axis direction is measured and mapped on the X-axis, this mapping in the X-axis direction is called "X-axis projection".

Figure 3:
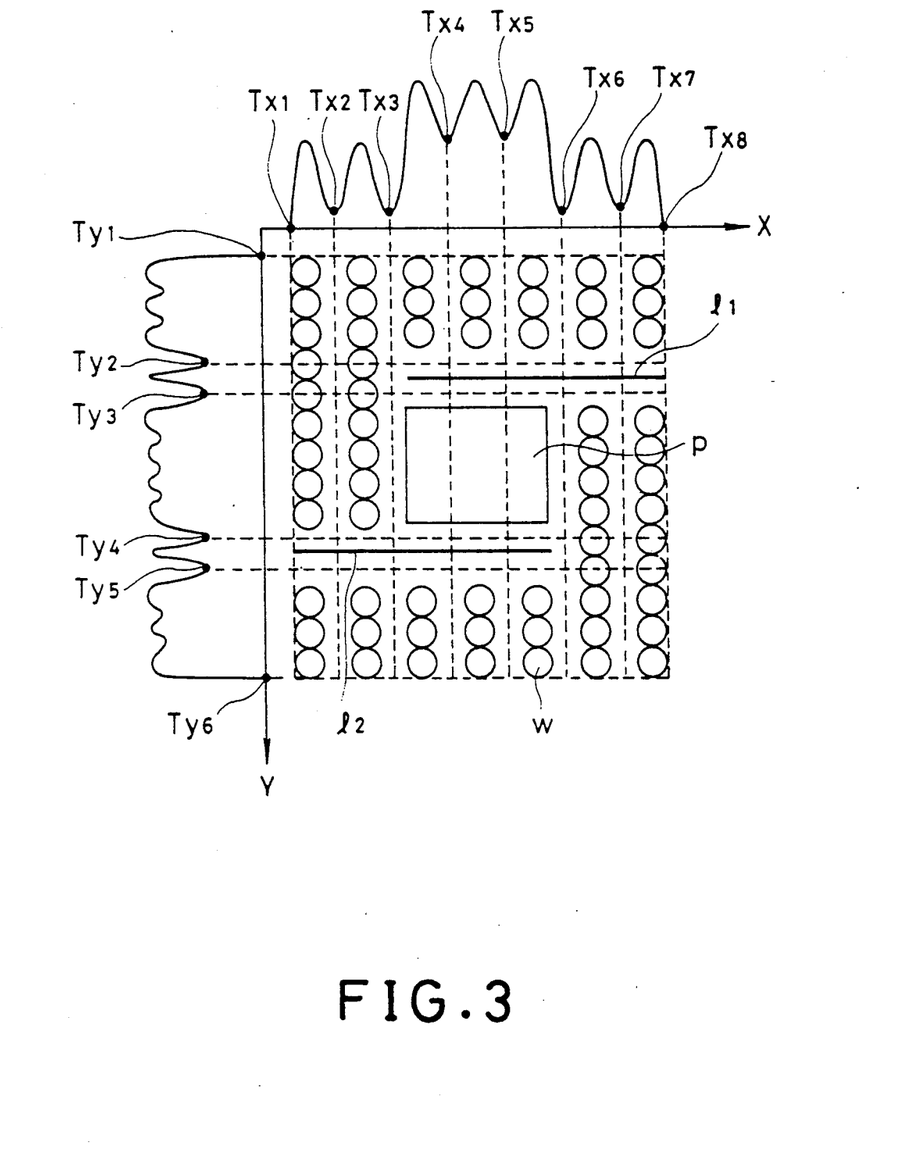
FIG. 3 is an explanatory diagram showing an example of graphic representation of an image to be processed by the embodiment of the present invention together with a pixel distribution projected on the peripheral line of said image.

FIG. 3 shows an example of a peripheral distribution of pixels obtained by projecting pixels contained in each line on the X-axis and Y-axis, in the case of a document image containing sentences having characters w arranged sequentially, a drawing p and ruled lines $l_1$ and $l_2$ other than texts. If positions corresponding to portions where unfilled pixels exist continuously in the Y-axis and X-axis direction in the document image is projected on the X-axis and Y-axis, the positions correspond to local minimum points or bottoms such as $T_{x1}$ to $T_{x8}$ and $T_{y1}$ to $T_{y6}$, respectively, in the peripheral distribution.

Next, at step S2, the processing of detecting a dividing line is performed.

In the processing at step S2, a bottom in the peripheral distribution is detected and a horizontal or vertical line passing through the bottom is defined as a dividing line. The X coordinates value of the point where the vertical dividing line intersects the X-axis is obtained from the local minimum value of a bottom in the peripheral distribution on the X-axis. Similarly, the Y coordinates value of the point where the vertical dividing line intersects the Y-axis is obtained from the local minimum value of a bottom in the peripheral distribution on the Y-axis.

A bottom in the peripheral distribution is defined as follows.

A peripheral distribution is expressed as P(i), i.e., the number of pixels measured at the i-th position on one axis. It is assumed that $P_{min}$ is defined as $$P_{min} = \text{MIN} (P_{(i-n)}, \ldots, P_{(i-)}, P_{(i)}, P_{(i+1)}, \ldots, P_{(i+n)}) \quad (1)$$

A bottom of the peripheral distribution is defined when $P_{min} = P_{(i)}$. However, if $P_{(i-n)} = \ldots = P_{(i-1)} = P_{(i)} = P_{(i+1)} = \ldots = P_{(i+n)}$, there may exist a plurality of bottoms of the peripheral distribution. In equation (1), i denotes a position of a bottom, and in terms of an X coordinates value for the peripheral distribution on the X-axis and a Y coordinates value for the peripheral distribution on the Y-axis, respectively. Accordingly, for example, with respect to the peripheral distribution on the X-axis, if $P_{xmin} = P_{x(a)}$, the dividing line is represented by $x = a$.

Further, there are small bottoms and peaks in a peripheral distribution obtained from an actual image data. In order to prevent an erroneous detection of a bottom due to such small bottoms, the peripheral distribution is first smoothed in accordance with the following equation prior to a detection of a bottom;

$$G_{(i)} = \frac{P_{(i-m)} + \cdots + P_{(i-1)} + P_{(i)} + P_{(i+1)} + \cdots + P_{(i+m)}}{2m + 1} \quad (2)$$

Figure 4A:
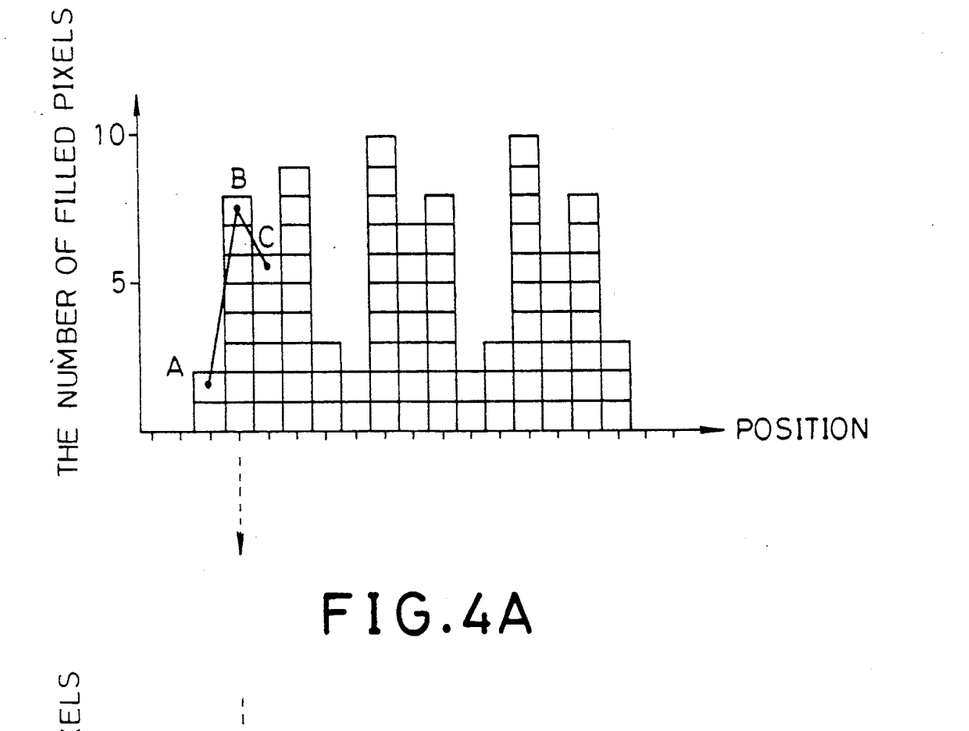
FIG. 4A and FIG. 4B are explanatory graphs illustrating an example of a smoothing treatment of a peripheral distribution.
Figure 4B:
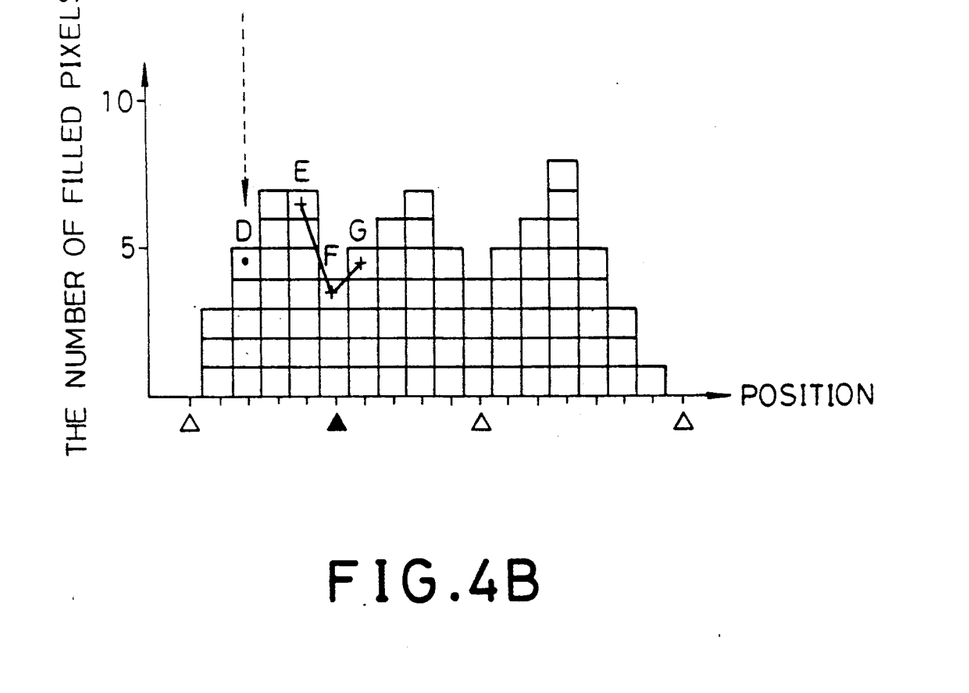

FIG. 4A and FIG. 4B show examples of image data smoothing and bottom detection in a peripheral distribution. In this embodiment of the present invention, m and n in equations (1) and (2) are set to be 1, i.e., $m = n = 1$. FIG. 4A shows an example of a peripheral distribution where the frequency or the number of filled pixels at three positions from the left side is 2, 8 and 6, respectively, that is, distribution values $A = 2$, $B = 8$ and $c = 6$. In FIG. 4B, for example, the number of filled pixels (8) at the position where B is measured is replaced by 5, i.e., an average D of the three values A, B and C ($D = (A + B + C)/3 \approx 5$) by calculating the average of A, B and C in accordance with equation (2) so as to form a smoothed peripheral distribution. In the same manner, a distribution value on the number of filled pixels at each position is replaced by a number of distribution value corresponding to an average of that distribution value and two distribution values at adjacent positions on both sides of that position so that the peripheral distribution is smoothed and the noise contained in the peripheral distribution given by the measured image data is eliminated.

A bottom in the peripheral distribution thus smoothed is detected as follows. For example, equation (1) is applied to three smoothed distribution values $E = 7$, $F = 4$ and $G = 5$. Then, a bottom is detected at a position where F is measured, i.e., the position marked with a symbol '▲'. Similarly, other positions marked with a symbol '△' are also detected as bottoms.

In the embodiment shown in FIG. 3, by means of the above mentioned operations, bottoms $T_{x1}$ to $T_{x8}$ for the peripheral distribution on the X-axis and bottoms $T_{y1}$ to $T_{y6}$ for the peripheral distribution on the Y-axis are obtained, respectively. Then, lines at positions where bottoms in the peripheral distributions on the X-axis and Y-axis are detected are determined and defined as "vertical dividing lines", for example, $L_{V1}$ to $L_{V8}$ and "horizontal dividing lines", for example, $L_{H1}$ to $L_{H6}$, which are perpendicular to the X-axis and the Y-axis, respectively.

Next, at step S3, the processing for extracting blocks is performed.

In the processing of extracting blocks, a document image is divided into blocks by the dividing lines obtained at step S2.

Figure 5A:
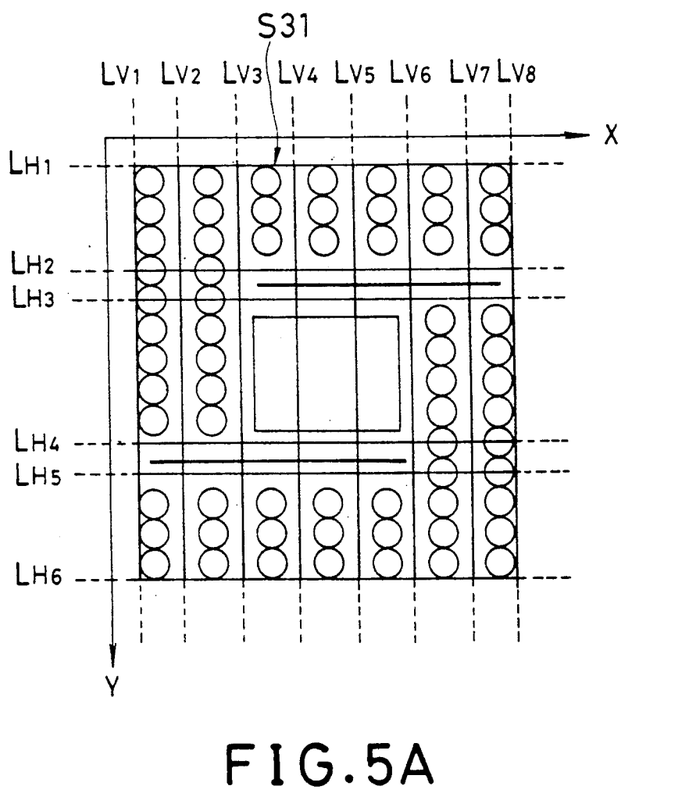
FIG. 5A and FIG. 5B are explanatory diagrams illustrating examples of a dividing process of an image in accordance with a dividing line and a reduction process of an image in accordance with the present invention.

FIG. 5A shows an example of a document image divided by the dividing lines $L_{V1}$ to $L_{V8}$ and $L_{H1}$ to $L_{H6}$. In this embodiment of the present invention, the document image is divided into 35 blocks by 8 vertical dividing lines and 6 horizontal dividing lines.

Figure 5B:
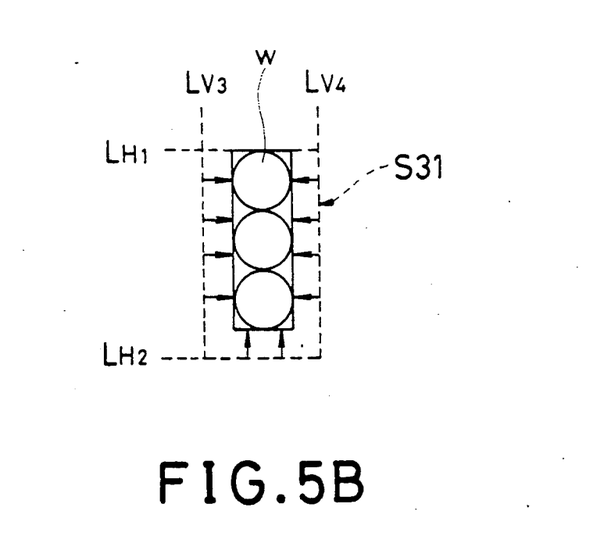
Figure 6:
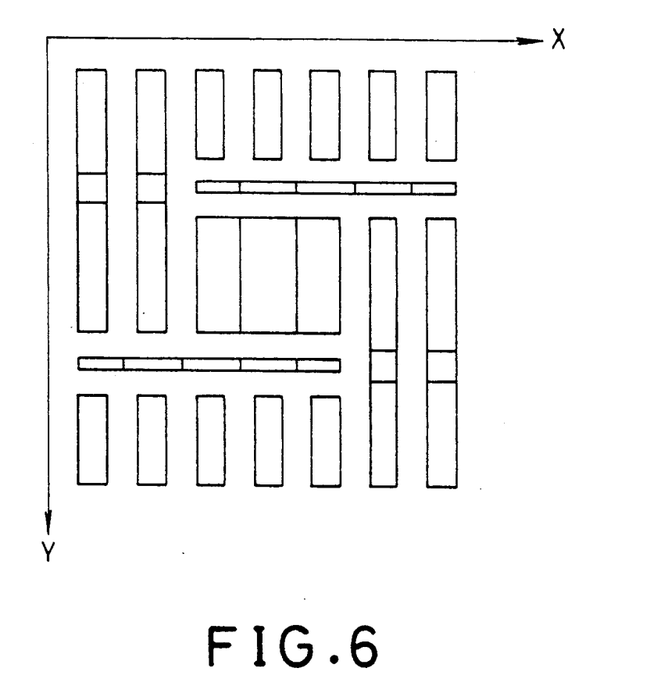
FIG. 6 is a layout diagram showing an example of a layout of extracted blocks in accordance with the present invention.

With respect to each block obtained a described above, the sizes of the blocks are reduced at step S3, so that a circumscribed rectangular frame containing characters in the block is reduced. FIG. 5B shows an example of the processing of reducing a size of a block to reduce the circumscribed rectangular frame. In a block S31, there exists a blank space between the dividing lines $L_{V3}$, $L_{V4}$ and $L_{H2}$ surrounding characters w and the characters w inside the circumscribed rectangular frame formed by these dividing lines. At step S3, a new circumscribed rectangular frame is formed by moving or setting back these dividing lines as shown by arrows until they reach or contact pixels which outline the characters w contained in the block, so that a newly circumscribed rectangular frame is formed as shown by solid lines in FIG. 5B. When the block contains no image or no filled pixel, the block is deleted. The same processing of forming a new circumscribed rectangular frame is applied to each of the blocks to redefine a block by reducing its size. In this embodiment of the present invention shown in FIG. 5A, there is no block deleted, so that there is no change in the number of blocks before and after redefining blocks. A layout of blocks obtained by redefining the blocks shown in FIG. 5A is shown in FIG. 6.

Next, at step S4, the processing of extracting sub-regions is performed.

Figure 7:
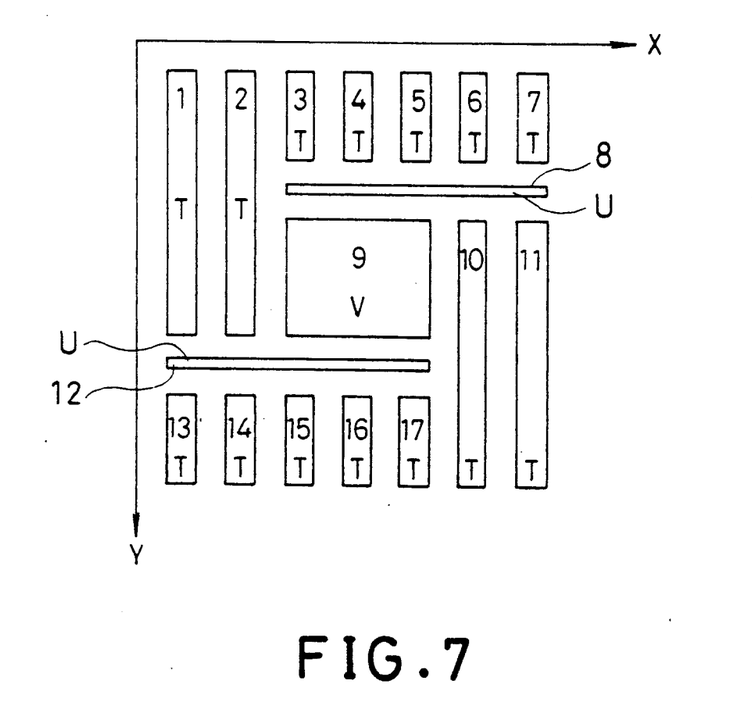
FIG. 7 is a layout diagram showing an example of a layout of extracted sub-blocks in accordance with the present invention.

In this processing, if two adjacent blocks extracted at step S3 contact each other, these two blocks are integrated or consolidated to form a new block. The new block consolidated in the manner shown above is called a "sub-region". In this case, even if there are two adjacent blocks contacting each other, but if an attribute (i.e., an attribute representing a type of image such as text, drawing, picture and so on) of data contained in one block is different from that in the other block, these two blocks should be treated independently and separated from each other by a blank space with unfilled pixels from a point of view of characteristics of the document layout. In other words, if two adjacent blocks contact each other, there is no blank space separating the two blocks and, attributes of an image contained in these two blocks are identical to each other. FIG. 7 show a layout of sub-regions extracted from the document image shown in FIG. 6. FIG. 7 will be explained in detail later.

Next, at step S5, the processing of extracting text regions is performed.

In the processing of extracting text regions, a line density and a filled-pixel density are first calculated from a run length corresponding to the number of continuously filled pixels. Subsequently, based on these densities, an attribute of each sub-region is judged so that text regions are extracted. In general, if attributes are the same in two sub-regions, the line densities and the filled-pixel densities in these two sub-regions are substantially identical to each other. Here, the judgment of attribute means that a type of an image in a sub-region is judged in accordance with characteristics such as an inherent line density which is specific to an image containing a text, a drawing, pictures and so on to affix an identification label to the sub-region.

In the following, procedures for judging an attribute of a sub-region in the preferred embodiment of the present invention will be explained.

First, the same label is assigned to sub-regions having substantially the same line density and substantially the same filled-pixel density, so that these sub-regions are classified into one group. The same processing is performed with respect to all the sub-regions, so that every sub-region is classified into any one of the groups.

In the embodiment of the present invention shown in FIG. 7, a numeral such as 1, 2, ..., 17 assigned to each sub-region represents a numerical sequence, and an alphabetic character such as T, U or V represents a group label. In FIG. 7, the 17 sub-regions are classified into three groups, i.e., T, U and V.

Subsequently, an attribute of each group is judged. In this procedure, for the purpose of recognizing characters by an apparatus for character recognition, a group containing text regions are judged and extracted from the classified groups. In general, an image data of a text region has the following characteristics in terms of a line density specific to a text region, in comparison to line densities specific to a drawing region and a picture region:

$$St > Sd, Sp \qquad (3)$$

where St is a line density in a text region,
Sd is a line density in a drawing region and
Sp is a line density in a picture region.

Based upon the above relation, the line densities St, Sd and Sp in the respective groups are compared with each other to judge sub-regions belonging to the group for text regions. In the embodiment of the present invention, sub-regions in the group T are judged as those in the group for text regions, whereas the other groups U and V are judged as groups for a drawing region and a picture region, respectively. In addition to the comparison in terms of the line density, a filled-pixel density can also be used as the comparison. If both densities are used for the comparison, the accuracy of the judgment is improved.

Finally, sub-regions adjacent to each other and judged to be contained in the group T are regarded as text regions and surrounded by a rectangular frame so that the text regions are displayed on a display screen as specifically marked regions other than the drawing regions and the picture regions. Here, each rectangular frame for a text region has a size and a shape so defined to exclude the other regions in the groups U and V from the inside of the rectangular frame.

In order to easily grasp the overall layout of a document image, it may be appreciated that one region such as a text region having sub-regions belonging to one group such as T is surrounded by a rectangular frame in accordance with a type of an image in those sub-regions. The rectangular frame is displayed together with information representing the group of the rectangular frame.

Figure 8:
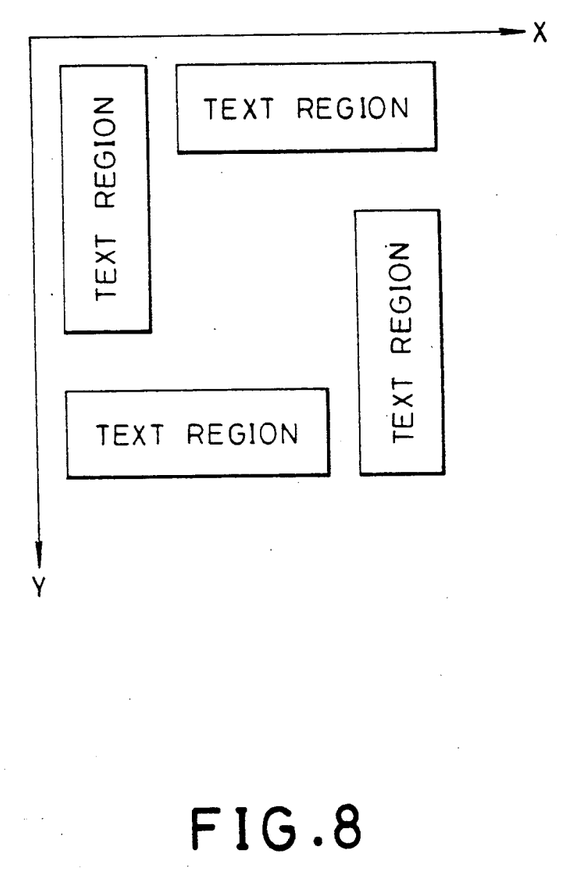
FIG. 8 is a layout diagram showing an example of an extracted text region in accordance with the present invention.

FIG. 8 shows an example of a layout of text regions extracted by the above described procedures. In the embodiment of the present invention shown in FIG. 8, 4 text regions are judged and extracted. The 4 text regions are displayed together with information "Text Region" or "T".

In the embodiment of the present invention, as described above, it will be appreciated that, even if a document contains text regions in the form of a complex layout, the text regions can be extracted easily by means of detecting bottoms in a peripheral distribution of filled pixels in image data and by detecting boundaries of regions. A text region surrounded by ruled lines and so on can be extracted. In addition, in the embodiment of the present invention, a bottom in the peripheral distribution of filled pixels is detected after the peripheral distribution is smoothed, so that the influence of noise involved in document image data is reduced. Such noise problem has not been solved by a peripheral distribution in a prior art system.

While it is preferable to embody the present invention by a computer as shown in FIG. 1 which is programmed to perform the procedures explained with reference to FIG. 2, the present invention can be also embodied by means of digital circuit technology using CPU, DPS or special purpose digital circuits for performing the procedures shown in FIG. 2.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An apparatus for extracting a text region in a document image, comprising:
    projection calculation means for calculating a peripheral distribution of filled pixels in a document image, which contains a mixed form of text and other kind of visual information and which is represented in terms of binary data, by projecting the filled pixels in a predetermined direction, said predetermined direction being a direction extending along either one of an X-axis and a Y-axis;
    detection means for detecting a bottom part in the peripheral distribution calculated;
    dividing means for dividing said document image into a plurality of primary image regions in accordance with a line intersecting the bottom part in said predetermined direction;
    reduction means for reducing each of the plurality of primary image regions divided by said dividing means until the size of said primary image region reaches the size of a circumscribed rectangular frame of filled pixels to form a plurality of secondary image regions in which unfilled pixels are excluded from said primary image regions;
    consolidating means for consolidating a plurality of secondary image regions adjacent to one another among said plurality of secondary image regions into a single tertiary image region; and
    extraction means for calculating a line density of filled pixels in said tertiary image region consolidated and for extracting a text region from said document image by judging that said tertiary image region is a text region when said calculation result indicates a text image.

2. An apparatus for extracting a text region in a document image as claimed in claim 1, further comprising:
    smoothing means for smoothing binary image data to be used for projection calculation by said projection calculation means.

3. An apparatus for extracting a text region in a document image as claimed in claim 1, wherein said extraction means further comprising:
    display means for displaying said tertiary image data extracted by said extraction means in the form of visual drawing.

4. An apparatus for extracting a text region in a document image as claimed in claim 1, wherein said extracting means further uses a filled-pixel density in addition to said line density when a type of a document image is judged.

5. An apparatus for extracting a text region in a document image as claimed in claim 1, further comprising:
    smoothing means for smoothing binary image data to be used for projection calculation by said projection calculation means.

6. A method of extracting a text region in a document image, comprising the steps of:
    calculating a peripheral distribution of filled pixels in a document image, which contains a mixed form of text and other kind of visual information and which is represented in terms of binary data, by projecting the filled pixels in a predetermined direction, said predetermined direction being a direction extending along either one of an X-axis and a Y-axis;
    detecting a bottom part in the peripheral distribution calculated;
    dividing said document image into a plurality of primary image regions in accordance with a line intersecting the bottom part in said predetermined direction;
    consolidating means for consolidating a plurality of secondary image regions adjacent to one another among said plurality of secondary image regions into a single tertiary image region; and
    extraction means for calculating a line density of filled pixels in said tertiary image region consolidated and for extracting a text region from said document image by judging that said tertiary image region is a text region when said calculation result indicates a text image.

7. A method of extracting a text region in a document image as claimed in claim 6, further comprising the step of smoothing binary image data to be used for calculating said peripheral distribution.

8. A method of extracting a text region in a document image as claimed in claim 6, wherein said tertiary image data extracted by said extraction means is displayed in the form of visual drawing by a display unit.

9. A method of extracting a text region in a document image as claimed in claim 6, wherein a filled-pixel density is used in addition to said line density when a type of a document image is judged.

10. An apparatus for extracting a text region in a document image as claimed in claim 6, further comprising the step of smoothing binary image data to be used for calculating said peripheral distribution.

11. A character recognizing apparatus for recognizing characters in a text region in a document image, comprising:
    projection calculation means for calculating a peripheral distribution of filled pixels in a document image, which contains a mixed form of text and other kind of visual information and which is represented in terms of binary data, by projecting the filled pixels in a predetermined direction extending along either one of an X-axis and a Y-axis;
    detection means for detecting a bottom part in the peripheral distribution calculated;
    dividing means for dividing said document image into a plurality of primary image regions in accordance with a line intersecting the bottom part in said predetermined direction;
    reduction means for reducing each of the plurality of primary image regions divided by said dividing means until the size of said primary image region reaches the size of a circumscribed rectangular frame of filled pixels to form a plurality of secondary image regions in which unfilled pixels are excluded from said primary image regions;
    consolidating means for consolidating a plurality of secondary image regions adjacent to one another among said plurality of secondary image regions into a single tertiary image region; and
    extraction means for calculating a line density of filled pixels in said tertiary image region consolidated and for extracting a text region from said document image by judging that said tertiary image region is a text region when said calculation result indicates a text image; and
    recognizing means for recognizing characters in said text region extracted.

12. A character recognizing apparatus as claimed in claim 11, wherein said extraction means further comprises display means for displaying said tertiary image data extracted by said extraction means in the form of a visual drawing.

13. A character recognizing apparatus as claimed in claim 11, wherein said extracting means further uses a filled-pixel density in addition to said line density when a type of a document image is judged.

14. A character recognizing apparatus as claimed in claim 11, further comprising smoothing means for smoothing binary image data to be used for a projection calculation by said projection calculation means.

* * * * *